US008453458B2

(12) United States Patent
Whurr et al.

(10) Patent No.: US 8,453,458 B2
(45) Date of Patent: Jun. 4, 2013

(54) GAS TURBINE ENGINE VARIABLE EXHAUST NOZZLE

(75) Inventors: John R Whurr, Derby (GB); Richard G Stretton, Loughborough (GB); David M Beaven, Nottingham (GB); Nicholas Howarth, Derby (GB)

(73) Assignee: Rolls-Royce PLC, London (GB)

( * ) Notice: Subject to any disclaimer, the term of this patent is extended or adjusted under 35 U.S.C. 154(b) by 1248 days.

(21) Appl. No.: 12/087,778

(22) PCT Filed: Jan. 23, 2007

(86) PCT No.: PCT/GB2007/000202
§ 371 (c)(1),
(2), (4) Date: Sep. 2, 2008

(87) PCT Pub. No.: WO2007/093760
PCT Pub. Date: Aug. 23, 2007

(65) Prior Publication Data
US 2009/0158704 A1    Jun. 25, 2009

(30) Foreign Application Priority Data

Feb. 18, 2006  (GB) .................................. 0603285.8

(51) Int. Cl.
*F02K 1/00*          (2006.01)
*B63H 11/10*         (2006.01)

(52) U.S. Cl.
USPC ...................................... 60/771; 239/265.19

(58) Field of Classification Search
USPC . 60/770, 771, 226.1, 226.3, 262; 239/265.11, 239/265.13, 265.19
See application file for complete search history.

(56) References Cited

U.S. PATENT DOCUMENTS

| | | | | |
|---|---|---|---|---|
| 2,408,099 A | * | 9/1946 | Sherman | 239/265.19 |
| 2,570,629 A | * | 10/1951 | Anxionnaz et al. | 239/265.33 |
| 2,828,603 A | * | 4/1958 | Laucher | 60/761 |
| 3,873,692 A | * | 3/1975 | Nara et al. | 424/116 |
| 3,897,001 A | * | 7/1975 | Helmintoller et al. | 60/226.2 |
| 4,043,508 A | | 8/1977 | Speir et al. | |
| 4,064,692 A | * | 12/1977 | Johnson et al. | 60/762 |
| 4,141,501 A | * | 2/1979 | Nightingale | 239/265.39 |
| 4,401,269 A | * | 8/1983 | Eiler | 239/265.17 |
| 4,527,388 A | * | 7/1985 | Wallace, Jr. | 60/204 |
| 4,793,134 A | * | 12/1988 | Coplin et al. | 60/226.1 |
| 4,858,857 A | * | 8/1989 | Lange et al. | 244/172.4 |
| 5,038,559 A | | 8/1991 | Blackmore | |
| 5,110,050 A | * | 5/1992 | Nightingale | 239/265.39 |
| 5,440,875 A | * | 8/1995 | Torkelson et al. | 60/226.1 |
| 5,680,755 A | * | 10/1997 | Hauer et al. | 60/266 |

(Continued)

FOREIGN PATENT DOCUMENTS

BE         525 244      5/1956
EP       1 344 928 A2   9/2003

(Continued)

*Primary Examiner* — Gerald Sung
(74) *Attorney, Agent, or Firm* — Oliff & Berridge, PLC.

(57) ABSTRACT

Variation in the available mixing plane areas in an exhaust arrangement of a gas turbine engine enables alteration and configuration for better thermal cycle performance of that engine. A shaped centre fairing is associated with an exit nozzle and a bypass duct such that channels between the fairing, nozzle exit and duct can be adjusted to change the available areas. Such variation is achieved by relative axial displacement, typically of the exit nozzle using an appropriate mechanism.

15 Claims, 5 Drawing Sheets

U.S. PATENT DOCUMENTS

| | | | | |
|---|---|---|---|---|
| 6,164,563 | A * | 12/2000 | Bouiller et al. | 239/265.37 |
| 2004/0006969 | A1 * | 1/2004 | Whurr | 60/262 |
| 2006/0016171 | A1 * | 1/2006 | Renggli | 60/204 |
| 2006/0053769 | A1 * | 3/2006 | Feuillard et al. | 60/226.1 |
| 2006/0112675 | A1 * | 6/2006 | Anderson et al. | 60/262 |

FOREIGN PATENT DOCUMENTS

| | | |
|---|---|---|
| EP | 1 380 746 A1 | 1/2004 |
| FR | 2 333 966 A1 | 7/1977 |
| GB | 1 270 434 | 4/1972 |

* cited by examiner

GAS TURBINE ENGINE VARIABLE EXHAUST NOZZLE

The present invention relates to gas turbines engines and more particularly with respect to the exhaust arrangements of such gas turbine engines.

Operation and configuration of gas turbine engines is well known. Thus, it will be understood that in such an engine an air intake is compressed by compressor stages, combusted with a fuel in a combustion stage and exhausted to an exhaust arrangement in the engine. Each of these stages have varying effects upon the efficiency and performance of the engine. With regard to the exhaust arrangement varying the area ratio at a mixing plane produces a number of potential advantages to the engines thermodynamic cycle in terms of performance and acoustics.

Jet noise is unique among engine noise sources in that it is generated outside the engine. The mixing process and the noise generation takes place over a considerable axial distance, up to ten nozzle diameters or more downstream of the engine. As the jet develops in the downstream direction, the length scale, or size, of the turbulence in the annular mixing layer increases.

Higher frequency noise is generated close to the nozzle exit due to the smaller length scale of the fluctuations; lower frequency noise is generated further downstream where the length scale of the turbulent fluctuations ultimately becomes comparable with the jet diameter. The general principle also applies to two stream or coaxial jets, but the situation is more complex because of the additional shear layers.

Historically, jet mixing noise reductions have gone hand in hand with reductions in specific thrust and increases in bypass ratio as a result of the lower mean jet velocity required to achieve a given thrust level. The addition of a slower moving, secondary, or bypass, stream of air exhausting concentrically around the primary, or core jet results in two annular mixing regions with significantly lower shear than that created by a single-stream jet at the same thrust.

At moderate bypass ratios of less than five to one, further jet noise reductions can be realised by mixing the core and bypass streams before exhausting the total flow to atmosphere. The mixing process can be enhanced by using a lobed core mixer, but for appreciable noise reduction the required duct length can still be quite large (around two nozzle diameters). Consequently, the drag and weight penalties of a long cowl; bypass nozzle, plus the convoluted mixer, need to be considered to determine if this is the optimum nozzle configuration for a particular aircraft application.

Figure 5:
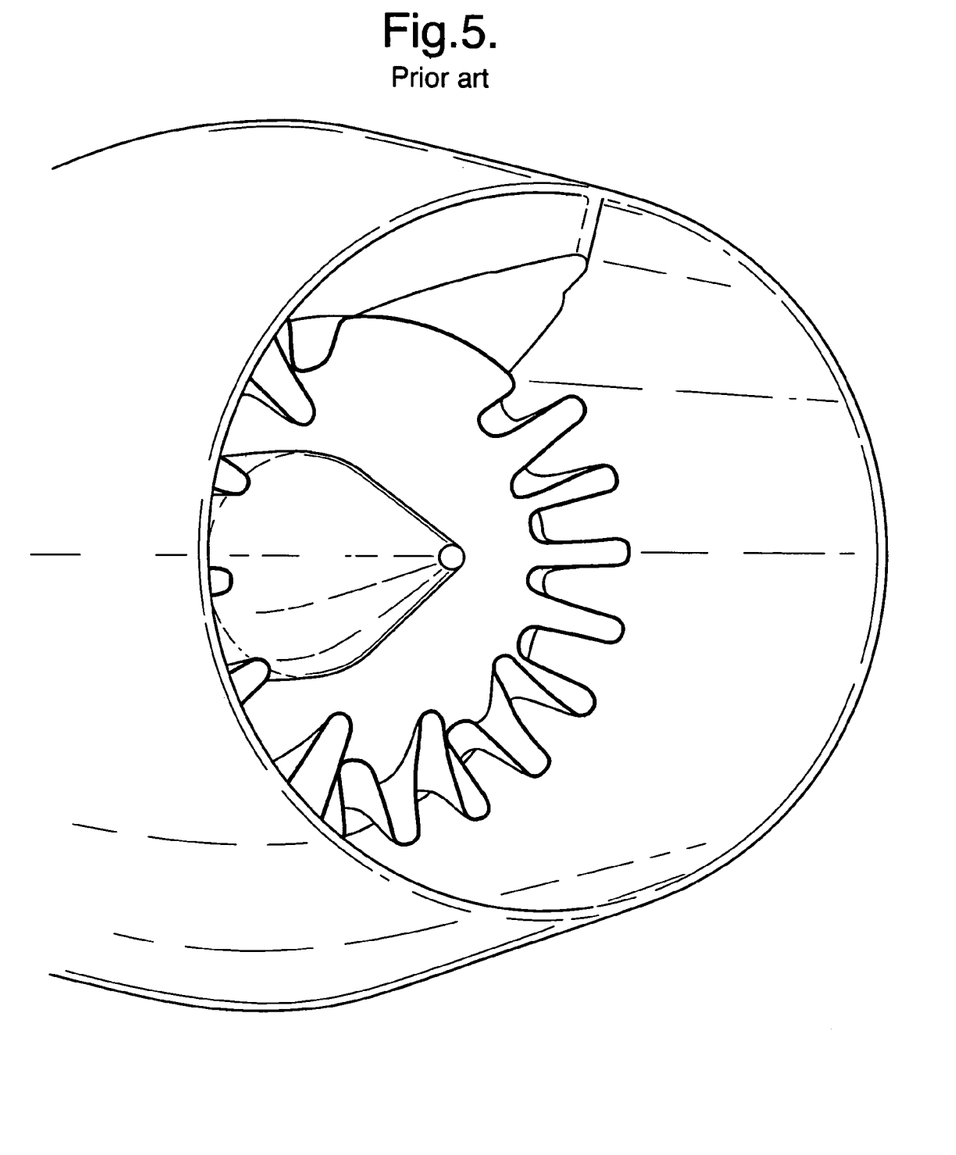
FIG. 5 is a turbine engine typically used in the industry.

In recent years, jet noise reductions have been sought by means of nozzle serrations. The enhanced mixing produced by the serrations in a forced chuted mixer can result in small but significant jet noise benefits (with acceptable aerodynamic performance); several production engine applications have been identified. The attached drawing marked "prior art" shows a typical forced mixer exit nozzle configuration.

The velocity shear effect, referred to above in the context of coaxial jets, also features in the jet noise change between static and flight operation of the engine. When the aircraft has forward speed, the velocity shear between the exhaust gases and the atmosphere is reduced, and the jet noise can reduce by, typically, five to ten decibels. In order to understand these very large "flight effects", experimental testing is often carried out in purpose-designed anechoic chambers.

Variations in the mixing plane have been achieved previously using complicated arrangements of overlapping flaps to change the ratio of areas at the mixing plane. Clearly such complication as outlined in U.K. patent No. 874496A can significantly add to weight and cost with regard to engine manufacture and operation.

In accordance with aspects of the present invention there is provided a gas turbine engine comprising an exhaust arrangement with a core exhaust having a shaped centre and an exit nozzle about the shaped centre arranged to define a passage therebetween having a mixer plane area, the exhaust arrangement characterised in that the arrangement includes an axial displacement mechanism to cause relative displacement between the exit nozzle and the shaped centre to vary the size of the mixing plane area.

Typically, the displacement mechanism is secured to the exit nozzle to cause displacement. Possibly, the exit nozzle is a forced chuted mixer.

Generally, the arrangement incorporates a bypass duct about the exit nozzle and the mixing plane area comprises the cross sectional area of a gap between the shaped centre and the exit nozzle combined with the cross sectional area of a gap between the exit nozzle and the bypass duct.

Typically, the gaps are an annular gap.

Possibly, a distal part of the exit nozzle is specifically variable in shape dependent upon operational requirements.

Possibly, the axial displacement mechanism comprises an electrical and/or hydraulic actuator.

Figure 3:
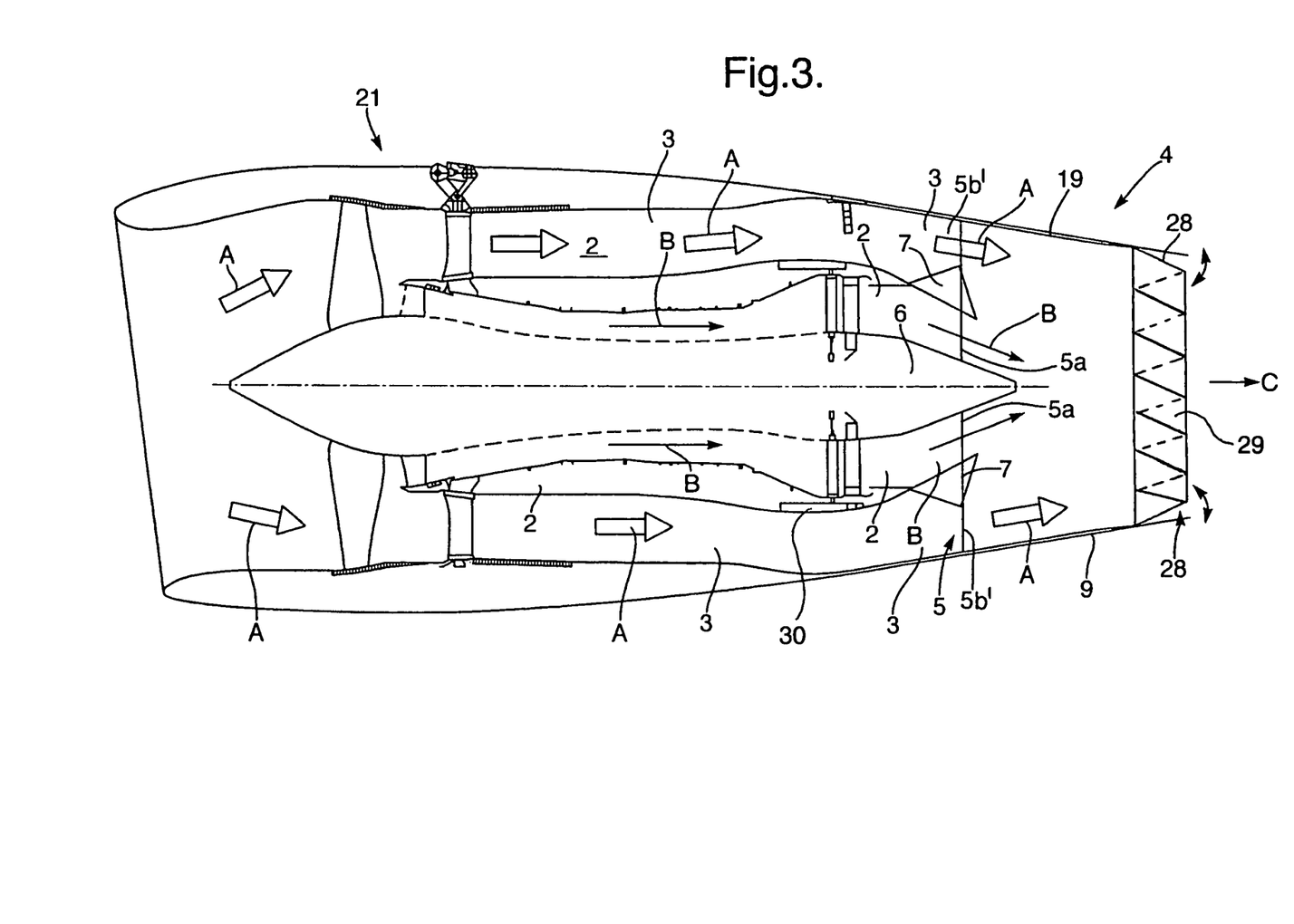
FIG. 3 is a schematic cross section of a second embodiment of the present invention at a first position; and, FIG. 4 is a schematic cross section of the second embodiment depicted in FIG. 3 at a second position.

Possibly, the axial displacement mechanism is adjacent to the exit nozzle. Alternatively, the axial displacement mechanism includes an actuator remote from the core exhaust and associated with the core exhaust for displacement via a mechanical linkage. Possibly, the mechanism comprises track slide bearings 30 (as shown in FIG. 3).

Typically, the bypass duct defines an exhaust nozzle. Possibly, the exhaust nozzle is variable in cross sectional area. Potentially, the exhaust nozzle comprises a plurality of overlapping flat petals 29 (as shown in FIG. 3).

Generally, the shaped centre is tapered towards the mixing plane area.

Possibly, the shaped centre and exit nozzle and/or bypass duct (outer wall) are respectively shaped in order to cause up to about fifteen percent variation in the mixing plane area by relative axial displacement.

Possibly, the exit nozzle and shaped centre are respectively shaped in order to provide up to about thirty to forty percent variation in a core mixing plane area defined by a gap between the exit nozzle and the shaped centre through relative axial displacement caused by the displacement mechanism.

Possibly, the exit nozzle and the duct bypass are respectively shaped in order to provide up to about thirty to forty percent variation in a bypass mixing plane area defined by a gap between the exit nozzle and the bypass duct caused by axial displacement provided by the axial displacement mechanism.

Potentially, the exit nozzle, shaped centre and bypass duct are respectively shaped in order to provide up to about fifty percent variation in a mixing area ratio between the core mixing plane area and the bypass mixing plane area as a result of axial displacement caused by the displacement mechanism.

Possibly, the shaped centre is axially displaceable.

Possibly, the shaped centre is independently axially displaceable from the exit nozzle.

Also in accordance with aspects of the present invention there is provided a gas turbine engine comprising:

a bypass duct for fan flow gases;

a core exhaust nozzle comprising a lobed mixer chute at its downstream end;

a tapering centre body;

a combined outlet nozzle having an exit plane downstream of the bypass duct, the mixer chute and centre body;

the downstream periphery of the lobed mixer chute defining a mixing plane where bypass and core gas flows mix;

the gas turbine engine characterised in that:

the lobed mixer chute is axially translatable between a first position and a second position, such that in the first position the bypass duct has a maximum flow area and the core duct/mixer chute has a minimum flow area and in the second position the bypass duct has a minimum area and the core duct has a maximum area.

Embodiments of the present invention will now be described by way of example and with reference to the accompanying drawings in which.

As indicated above, varying the area ratio at a mixing plane of an exhaust arrangement within a gas turbine engine can produce a number of potential advantages in terms of engine thermodynamic cycle and in particular performance and acoustic characteristics. Increasing the core/fan stream area ratio will raise fan stream exit pressure and reduce core stream exit pressure resulting in a potentially more uniform exhaust jet velocity profile and therefore jet noise particularly during high thrust take off episodes. It will also be understood reducing the core/fan stream mix area ratio will have the effect of reducing fan pressure ratio at a given thrust level or of enabling an engine to produce more thrust when operated at its limiting fan pressure ratio for example during engine thrust for a climbing episode. It will also be understood that selectivity may also be provided with regard to achieving a mixer area setting between the two first and second position extremities for available mixer area to allow greater adaptability for more efficient operation at cruising stages of engine operation particularly with respect to engine thermodynamics.

Figure 1:
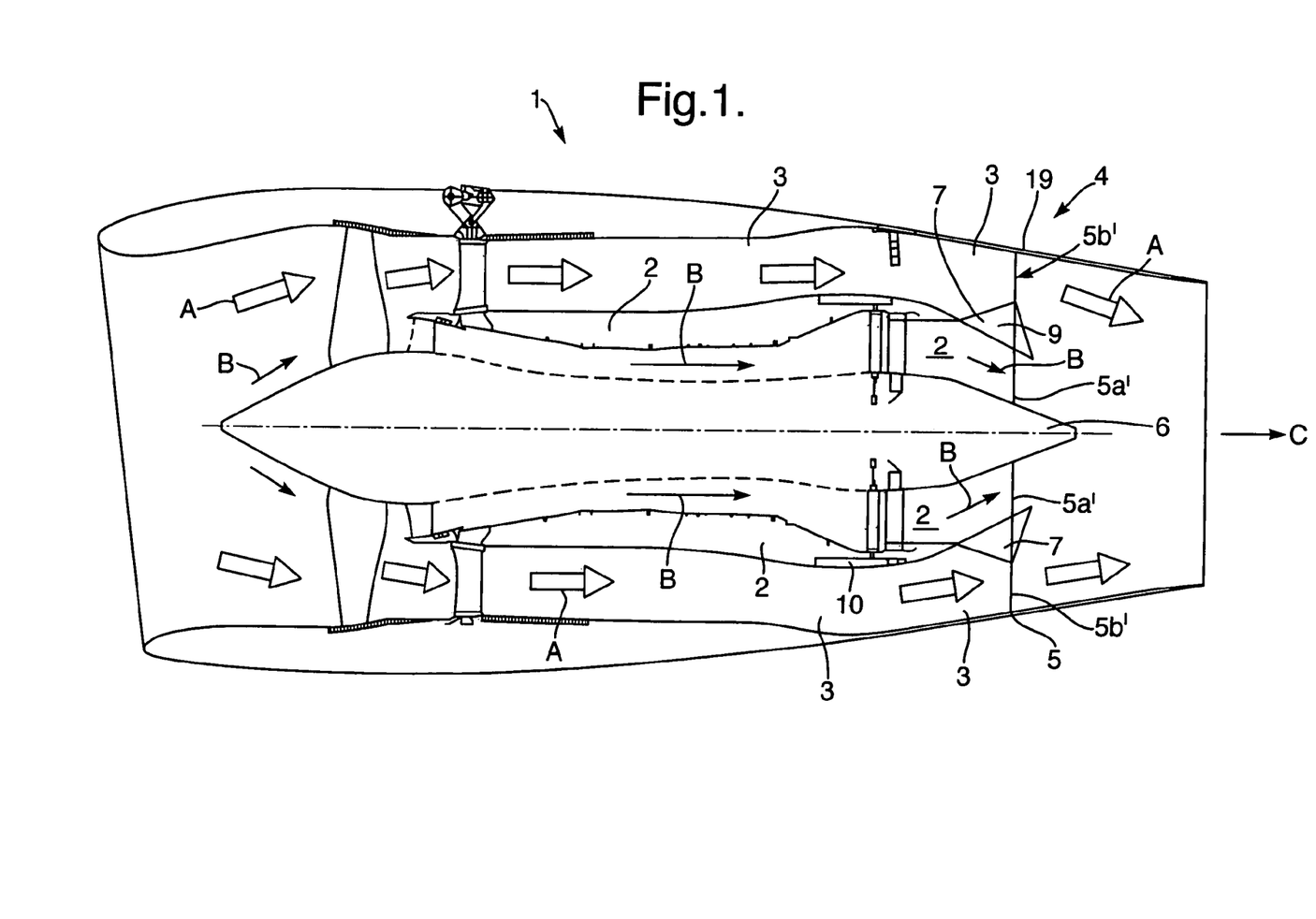
FIG. 1 is a schematic cross section of a first embodiment of the present invention at a first position.
Figure 2:
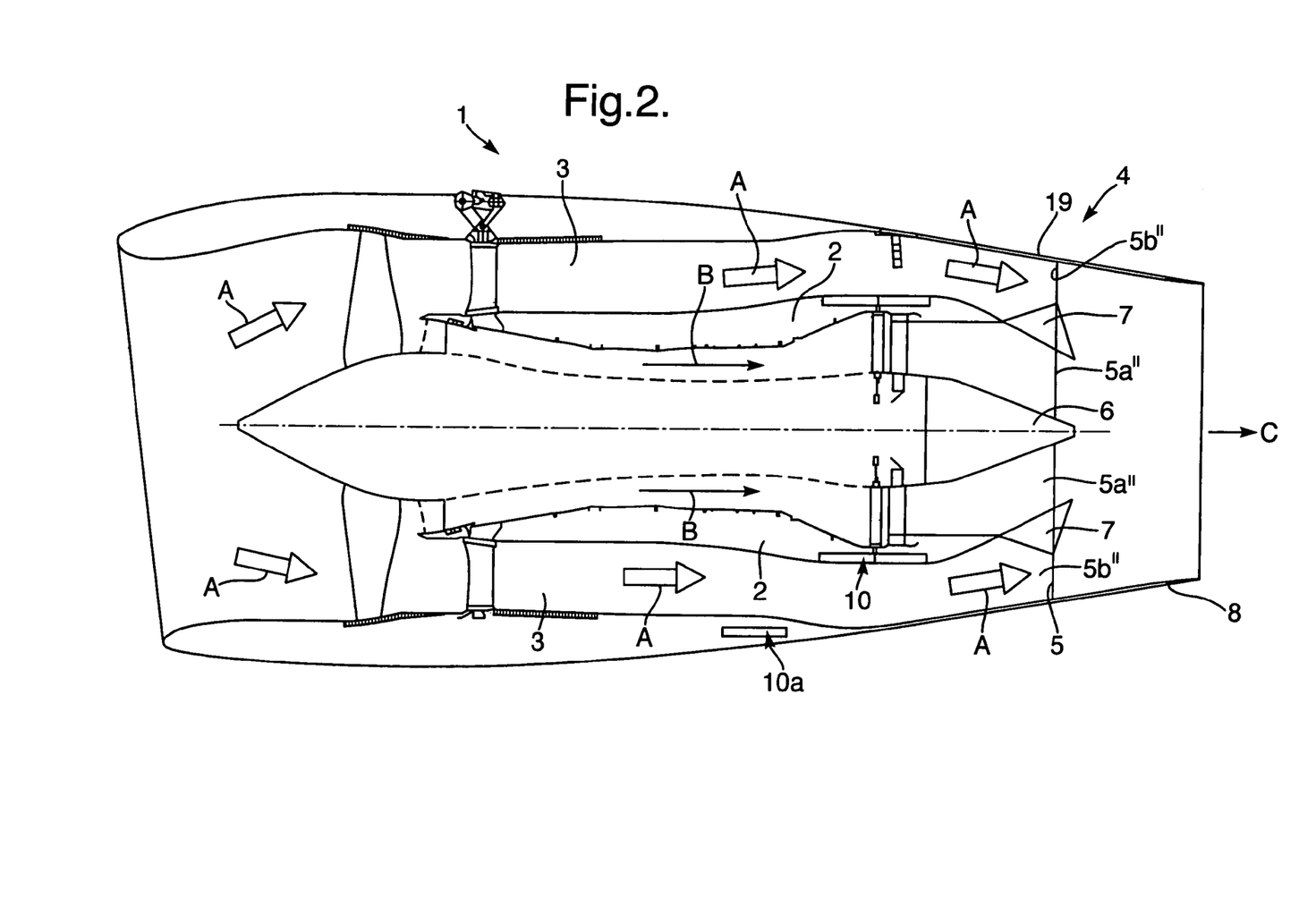
FIG. 2 is schematic cross section of the embodiment depicted in FIG. 1 at a second position.

FIGS. 1 and 2 illustrate a first embodiment of aspects of the present invention. Thus, a gas turbine engine 1 comprises a number of stages arranged to rotate in order to develop gas flows respectively in a core channel or chute 2 and bypass channel or chute 3. A radially inner wall defines the core engine flow duct 2. Turbo machinery, such as intermediate and high pressure compressors. Combustor and hp, ip and lp turbines are housed within this flow duct 2 as in any conventional 3 or 2 shaft engine. It will be understood that gas flows travel in the direction respectively of arrowheads A, B through the engine 1 to an exhaust arrangement 4. It will be understood that the channels 2, 3 are essentially defined as gaps between opposed surfaces in the gas turbine engine 1. In such circumstances as the engine is generally rotating about a shaft these channels 2, 3 take the form of annular openings.

It will be understood the operational performance of the engine 1 can be varied by altering a mixing plane 5 in terms of proportions of available areas in the core channel 2 and the bypass channel 3 in the exhaust arrangement 4. As outlined above, such variations will alter the core exit pressures and fan pressures of the flows A, B.

In accordance with aspects of the present invention a core flow channel 2 towards the exhaust arrangement 4 is defined by a shaped fairing centre 6 and a distal end of an exit nozzle 7. The respective distal end of the nozzle 7 may be lobed or otherwise shaped to achieve the desired channel 2 cross section in the area of the mixing plane 5. The shaped centre 6 generally takes the form of a tapering cone towards an exhaust nozzle 8 of the gas turbine engine 1. It is the axial translation of the forced mixer and the converging shapes of the core plug 6 and bypass duct 19, which changes the areas 5a and 5b. The area of the fixed mixer itself remains constant.

In accordance with aspects of the present invention the exhaust exit 7 at its distal end is profiled and shaped to cause variations in the available area to the channels 2, 3 at the mixing plane 5. In such circumstances the exit nozzle 7 is a lobed or fluted mixer and as depicted can take the form of a wedge or triangular cross section. The particular shaping of the distal end of the exit nozzle 7 will be chosen dependent upon operational performance. In some situations the top edge of the wedge may be substantially flat as depicted by broken line 9 but normally, as illustrated, there will be an inclination to such a configuration in order to create the variation in area 5 in both the channels 2, 3. These areas are depicted in FIGS. 1 and 2 as area 5a and area 5b. Area 5a can be termed a core mixing plane area. Area 5b can be termed as a bypass mixing plane area. It is the relative ratios and values of these areas 5a, 5b which in accordance with aspects of the present invention are adjusted for engine 1 performance.

Adjustment of the areas 5a, 5b is achieved through axial displacement in the direction of arrowhead C. This axial displacement is relative respectively between the shaped centre 6 and nozzle exit 7 as well as between the nozzle exit 7 and a bypass duct 19, which extends to the exhaust duct nozzle 8. As indicated, this axial movement may be relative but most typically it is the exit nozzle 7 which is displaced by an appropriate mechanism 10 such as rams. The mechanism 10 as illustrated can be located adjacent to a core part of the exit nozzle 7 but at such a position it will be understood that the mechanism 10 will be subject to relatively high temperatures and there may be accommodation space problems. In such circumstances as illustrated in FIG. 2 an actuator mechanism 10a can be provided at a cooler and/or more convenient location such as within the bypass duct cowling and axial displacement achieved through an appropriate mechanical linkage across the bypass channel 3.

As indicated above, it is by appropriate profiling of the exit nozzle 7 that this axial displacement in the direction of arrowhead C can vary the areas 5a, 5b available to the respective flows A, B. Particular choice of shaping, that is to say fluted or lobed to the distal end of the exit nozzle 7 will be dependent upon operational requirements. Furthermore, the angle of inclination of the exit nozzle 7 and in particular its distal end again will be chosen in order to achieve the appropriate variation in the areas 5a, 5b as a result of the axial displacement between a first position and a second position The first position is depicted for example as shown in FIG. 1 whilst the second position for example is depicted in FIG. 2. As can be seen the respective area values for 5a', 5b' are different from the area values 5a'', 5b''. These variations are as a result of the axial displacement and therefore the effect of the distal end of the exit nozzle 7. By these variations between 5a', 5b' and 5a'', 5b'' mean as indicated above the engine 1 configuration can be altered dependent upon differing operational requirements.

In the above circumstances it will be understood by use of only a simple actuator driven axial displacement, that is to say of the shaped centre 6 alteration in the area ratios between the respective chutes or channels 2, 3 through the engine 1 is achieved. It will be understood that the geometry of the channel 2 is such that by translating the axial displacement axially there is a variation in the flow area of the channel 2 or chute through the engine 1. Similarly, the geometry of the bypass duct in terms of its outer wall is such that by the displacement of the nozzle exit there is a variation in the flow area of the channel 3 or cold chute in the engine 1. The exit nozzle 7 effectively acts as a mixer for respective gas flows through the chutes or channels 2, 3. This mixing effect is varied dependent upon the respective available flow areas 5a, 5b.

The total available flow area at the mixing plane 5, that is to say the total area available may vary with the respective different relative axial positions of the shaped centre fairing 6, exit nozzle 7 and duct 19. As indicated, the potential ranges for the proportional relative variations in the areas 5a, 5b in the mixing plane 5 will particularly be determined by the profiling of the distal end of the exit nozzle 7 as well as the axial displacement range of that exit nozzle 7 produced by the mechanism 10. Typically, an exhaust arrangement in accordance with aspects of the present invention will be available to provide a variation in the available flow area, that is to say a combination of 5a, 5b of up to about fifteen percent of the total mixing plane area 5a, 5b available. Each area 5a, 5b may itself be varied by up about thirty to forty percent in both the channels 2, 3 with the potential for up to about a fifty percent variation in the mixer area ratio, that is to say 5a:5b.

As indicated above axial displacement is provided by an appropriate mechanism. This mechanism may comprise track guide bearings which cause a relative movement through one or more hydraulic and/or electrical actuators appropriately located within the engine 1.

As indicated above, it is envisaged with respect to certain aspects of the present invention that it will be advantageous to utilise the invention when applied to a force (load) mixer arrangement for the exit nozzle 7. However, it is possible that for some applications it may be preferential to adopt an annular mixer configuration, that is to say without mixing lobes. An annular mixer fairing would translate axially in a similar fashion to that with regard to a lobed mixer to achieve a similar variation in the annulus gap areas variable in the mixing plane 5.

As indicated above, it is relative movement between the opposed surfaces in the chutes or channels 2, 3 which creates the variations in the areas 5a, 5b. In such circumstances the exit nozzle 7 may be displaced or the shaped centre fairing 6 displaced or both axially displaced in order to create the variations in accordance with aspects of the present invention.

Figure 4:
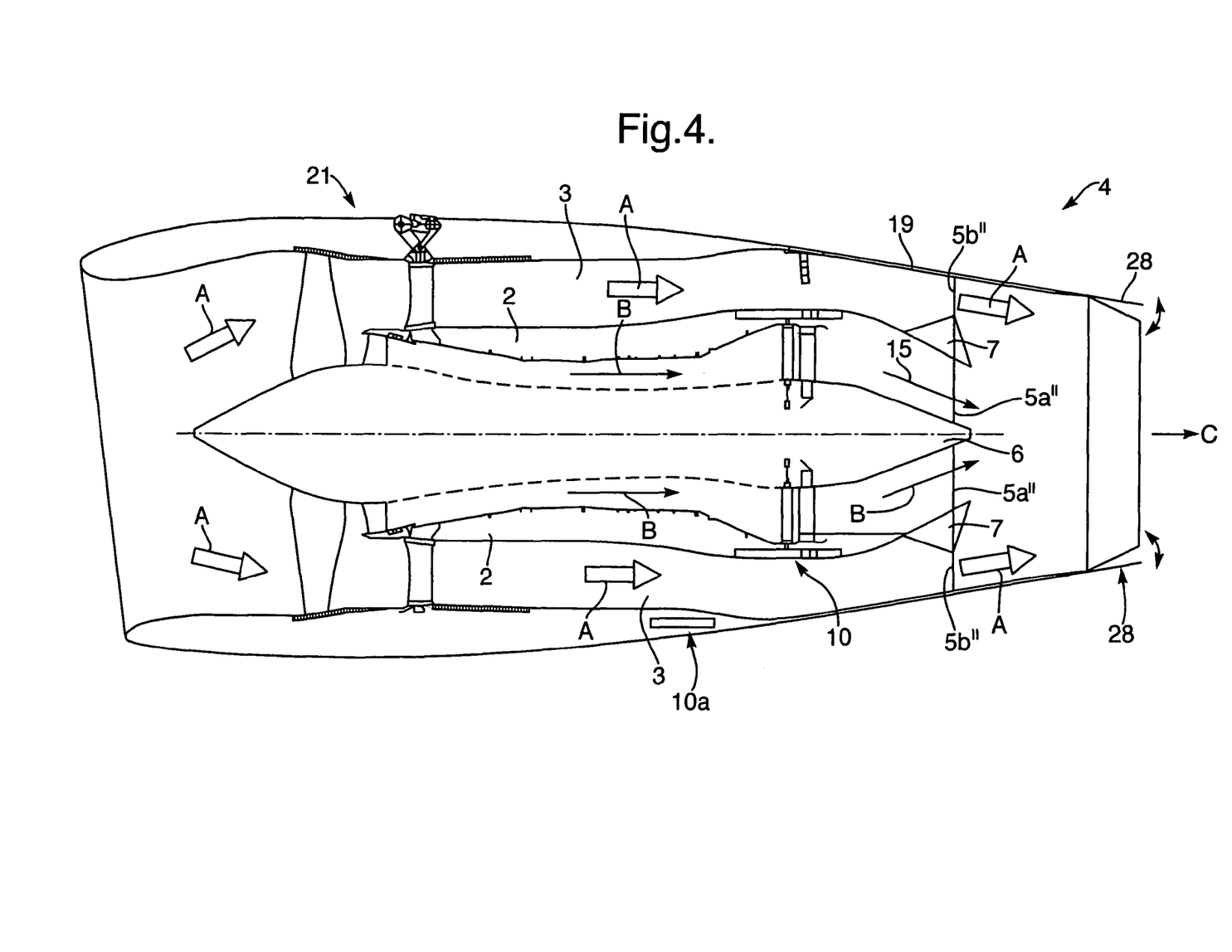

FIGS. 1 and 2 illustrate an engine 1 in which there is a fixed area exhaust nozzle 8. Further variation for operational performance may be provided by utilisation of aspects of the present invention with a variable area exit nozzle 28 as depicted in FIGS. 3 and 4. For clarity similar reference numerals have been utilised for similar elements in FIGS. 3 and 4 as those utilised in FIGS. 1 and 2.

It will be understood that a variable area exhaust nozzle configuration can be achieved by a number of systems including by provision of overlapping petals which encroach and disperse dependent upon the area of exhaust nozzle required. It will be appreciated that operating a variable mixer in terms of axial displacement to adjust the variable areas 5a, 5b in association with a variable area exhaust nozzle 28 can further enhance the potential advantages with regard to raising fan stream exit pressure and reducing core stream exit pressure or conversively reducing core/fan stream mixing area to provide a reduced fan pressure ratio at a given thrust level or enabling greater thrust at a limiting fan pressure ratio. The combination of a variable mixer area 5a, 5b with a variable area nozzle 28 provides the additional capability to control total engine 21 performance in that air flow as well pressure balance between a fan flow B and a core flow A. Such flexibility can facilitate maximisation of engine flow for conditions where it is desirable to minimise noise or maximise thrust or can be used during cruise to optimise aerodynamic matching between the intake and engine performance.

As outlined above, variability with respect to the mixer area ratio 5a:5b has particular advantages in terms of engine operational control. In accordance with aspects of the present invention such variation in the mixer area ratio is achieved with few moving parts and a relatively simple axial relative displacement. In such circumstances variation in the mixer area ratio is achieved with a chute forced mixer with optimised aerodynamic geometry which in turn will provide high mixing efficiency between core (arrowhead A) and fan (arrowhead B) streams and relatively low pressure loss maximising the benefits of aerodynamic cycle for performance and jet noise.

In addition to the above aspects of the present invention will facilitate maintenance of mixer geometry to achieve good aerodynamic/acoustic performance at all geometric settings and operational conditions for the relative positioning along the axial displacement range between a first position and a second position dependent upon the actuator mechanism. Typically, the first position will be determined for one expected operational condition such as take off thrust whilst the other extremity in relation to mixing area variation may be specified for an alternative thrust level such as typical during aircraft climbing with the engine operated with a mixing ratio between the first position and the second position in normal cruising conditions. In such circumstances by aspects of the present invention a mixer geometry in the mixer plane 5 can be provided with a smoother aerodynamic profile both through the core chute or channel 2, and fan chute or channel 3 in order that there are low pressure losses in both flows A, B over a wide range of mixing plane area ratios 5a:5b.

An exhaust arrangement in accordance with aspects of the present invention will provide the possibility of varying the initial mixing plane area as well as the area ratio between the areas 5a, 5b. In such circumstances flexibility over the potential range of areas and ratios is provided.

Modifications and alterations in accordance with aspects of the present invention will be understood by those skilled in the art. Thus, for example the distal end of the exit nozzle 7 will generally be of a fixed shape but, where possible, this shape may alter by specific action through use of shape memory materials or actuators to adjust the shape but within the exit nozzle 7 profile. It will also be understood in some situations there may not be a bypass duct so only the core stream channel 2 maybe adjusted by axial displacement to vary area 5a.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A gas turbine engine having an exhaust arrangement, the exhaust arrangement comprising: a core exhaust having a shaped center and an exit nozzle about the shaped center arranged to define a passage therebetween, a bypass duct arranged so as to define an exhaust nozzle about the exit nozzle, the core exhaust and bypass duct defining a mixing plane having a cross-section that includes: i) a first cross sectional area between the shaped center and the exit nozzle and (ii) a second cross sectional area between the exit nozzle and the bypass duct, wherein when the gas turbine engine is viewed in a cross section, the mixing plane transects at least a portion of the shaped center; and the mixing plane is; i) substantially perpendicular to a longitudinal axis of the gas turbine engine, and ii) located upstream of an exhaust nozzle exit, an axial displacement mechanism configured to extend along a longitudinal axis of the gas turbine engine to cause relative displacement of the exit nozzle relative to the shaped center and bypass duct so as to vary the ratio of the mixing plane area between the first and second cross sectional areas, so as to vary the first and second cross sectional areas.

2. The gas turbine engine as claimed in claim 1 wherein the displacement mechanism is secured to the exit nozzle to cause displacement.

3. The gas turbine engine as claimed in claim 1 wherein the first and second cross sectional areas are annular gaps.

4. The gas turbine engine as claimed in claim 1 wherein the axial displacement mechanism comprises an electrical and/or hydraulic actuator.

5. The gas turbine engine as claimed in claim 1 wherein the axial displacement mechanism is adjacent to the exit nozzle.

6. The gas turbine engine as claimed in claim 1 wherein the axial displacement mechanism includes an actuator remote from the exit nozzle and associated with the exit nozzle for displacement via a mechanical linkage.

7. The gas turbine engine as claimed in claim 1 wherein, the axial displacement mechanism comprises track slide bearings.

8. The gas turbine engine as claimed in claim 1 wherein the exhaust nozzle is variable in cross sectional area.

9. The gas turbine engine as claimed in claim 7 wherein the exhaust nozzle comprises a plurality of overlapping flat petals for varying the exhaust nozzle cross-section.

10. The gas turbine engine as claimed in claim 1 wherein the shaped center is tapered in an axial direction.

11. The gas turbine engine as claimed in claim 1 wherein the exit nozzle and shaped center are respectively shaped in order to provide up to forty percent variation in the first cross sectional area caused by the displacement mechanism.

12. The gas turbine engine as claimed in claim 1 wherein the exit nozzle and bypass duct are respectively shaped in order to provide up to forty percent variation in the second cross sectional area caused by axial displacement provided by the axial displacement mechanism.

13. The gas turbine engine as claimed in claim 1 wherein the exit nozzle, shaped center and bypass duct are respectively shaped in order to provide up to fifty percent variation in the ratio of the mixing plane area between first and second cross sectional areas as a result of axial displacement caused by the displacement mechanism.

14. The gas turbine engine as claimed in claim 1 wherein the exit nozzle is provided by a forced chuted mixer.

15. The gas turbine engine as claimed in claim 1, wherein:
the exit nozzle has a lobed mixer chute at a downstream end;
the shaped center is a tapering center body;
the exhaust nozzle has an exit plane downstream of the bypass duct, the lobed mixer chute and center body; and
the lobed mixer chute is axially translatable between a first position and a second position, such that in the first position the second cross sectional area has a maximum flow area and the first cross sectional area has a minimum flow area and in the second position the second cross sectional area has a minimum area and the first cross sectional area has a maximum area.

* * * * *